Dec. 5, 1961 A. M. J. BELLIER 3,011,572
SYSTEM FOR FILLING A PLURALITY OF RECEPTACLES
WITH EQUAL WEIGHTS OF MATERIAL
Filed Feb. 19, 1960 2 Sheets-Sheet 1

Dec. 5, 1961   A. M. J. BELLIER   3,011,572
SYSTEM FOR FILLING A PLURALITY OF RECEPTACLES
WITH EQUAL WEIGHTS OF MATERIAL
Filed Feb. 19, 1960                                                2 Sheets-Sheet 2
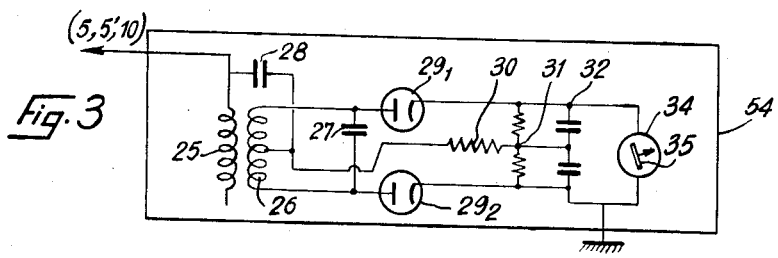
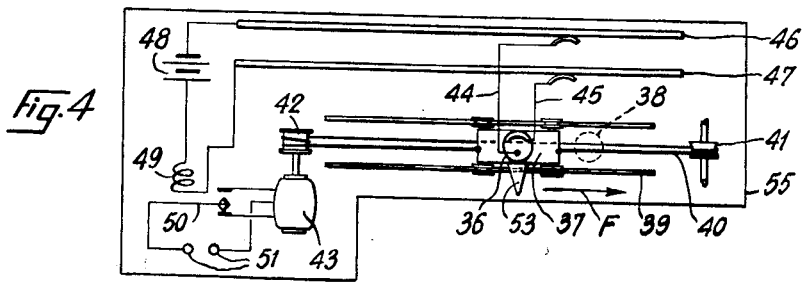
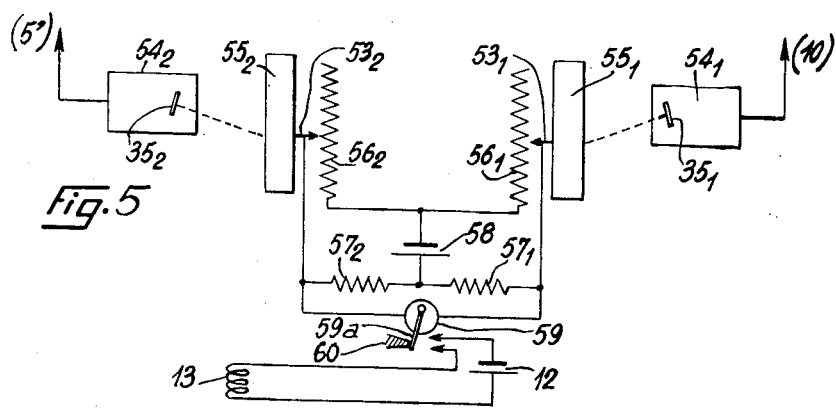
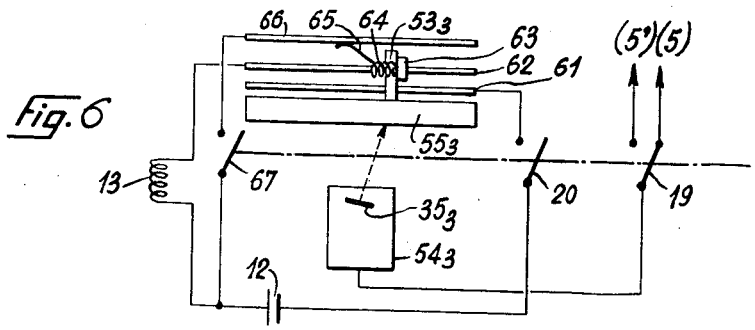

United States Patent Office 3,011,572
Patented Dec. 5, 1961

3,011,572
SYSTEM FOR FILLING A PLURALITY OF RECEPTACLES WITH EQUAL WEIGHTS OF MATERIAL
Anselme Marie Jean Bellier, 5 Ave. de Villeneuve, Garches, France
Filed Feb. 19, 1960, Ser. No. 9,875
Claims priority, application France Feb. 24, 1959
8 Claims. (Cl. 177—80)

It is frequently required for various engineering and commercial purposes to fill a plurality of different receptacles, which will not generally all possess the same deadweight, with strictly equal weights of material. The broad method used involves first weighing the empty receptacle then weighing the receptacle while material is gradually fed into it, and arresting the feed of material when the total weight attains a value equal to the sum of previously determined deadweight plus the prescribed weight of material.

When however it is desired to apply such method in an automatic filling plant, in which the material feeding process is automatically arrested by a signal produced when the desired total weight has been attained, the difficulty is then to generate such a signal at the proper instant of time even though the prescribed total weight will in each case differ because of the different deadweight term in the sum at each filling operation.

It is an object of the invention to overcome this difficulty in an especially advantageous manner and to provide an automatic weighing system of the type described which will be extremely convenient to apply in partly or fully automatic filling plants.

In attaining this object, the invention makes use of a known type of weighing device which is herein termed a vibratory-string dynamometer. As is well known, the vibratory frequency of a vibrating tensioned string depends on the stretching of said string, so that, for a given tensioned string, the variation of that frequency is a measurement of the free length of the string, i.e., the distance of the members beween which said string is stretched. Consequently, in a vibratory-string dynamometer, the vibratory string, to which sustained vibrations are imparted by any suitable means, has its ends attached to spaced points of a suitable elastically deformable support adapted to be deformed on application of a load thereto so as to vary the spacing between said points. While such sensitive dynamometers may be provided in which the support is deformable under compression, tension, flexion or torsion, loads, one usual form is that wherein the device is adapted to be loaded in tension, that is, the load to be weighed is suspended from the base of the support. It is to be distinctly understood, however, that the invention is not to be limited to the use of any particular form of vibratory-string dynamometer, and that this expression as used herein and in the claims is to be construed broadly in accordance with the general definition thereof given above.

In accordance with the invention, in one aspect, there is provided a system for filling a plurality of receptacles of different deadweights with equal prescribed weights of material, which system comprises: a first vibratory-string dynamometer device adapted to generate a first frequency when loaded with an empty receptacle; means for storing an indication of said first frequency; a second vibratory-string dynamometer device similar to the first adapted to have an empty receptacle loaded thereon and means associated with said second device for feeding material to said receptacle loaded thereon whereby said second device generates a gradually varying second frequency; means for comparing said second frequency with the stored indication of said first frequency; and means for arresting the material feeding process when said second frequency has attained a prescribed relationship with said stored indication of the first frequency.

In accordance with an important further feature of the invention, the two dynamometer devices are present with respect to one another in such a manner that the said prescribed relationship between the second frequency and the stored indication of the first frequency, obtaining when the receptacle has been filled with the prescribed weight of material, is equality. For this purpose, as will be shown hereinafter, it is simply necessary that the relative setting of the device be such that the frequency generated, by the first device in the absence of a load thereon equals the frequency generated by the second device under a load equal to said prescribed weight.

The stored indication of the first, fixed, frequency which is a measure of the deadweight of the receptacle, may assume a variety of forms. In other words, various forms of memory systems may be used for memorizing or storing an indication of said deadweight frequency. In one convenient form, the indication may be stored as a record of said first frequency produced on a suitable record medium such as magnetic tape or the like, which record is adapted to be subsequently played back during the filling process in order to compare the gradually varying second frequency with the stored first frequency, e.g. by means of a differential frequency-meter arrangement. In another form, the indication may be stored as the position of a displaceable member, e.g., an index positioned by the displaceable output element of a frequency-meter, and the second frequency will then be compared with this stored indication during the filling process by comparison of the position of the displaceable output element of the frequency-meter in response to said second frequency, with the previously attained position as assumed by said index.

Embodiments of the invention will now be described for purposes of illustration but not of limitation with reference to the accompanying diagrammatic drawings, wherein:

FIG. 1 diagrammatically illustrates a first embodiment of the system;

FIG. 2 diagrammatically illustrates a second embodiment;

FIG. 3 is a circuit diagram of one suitable form of frequency-meter;

FIG. 4 shows a photo-electrical follow-up mechanism;

Figure 1:
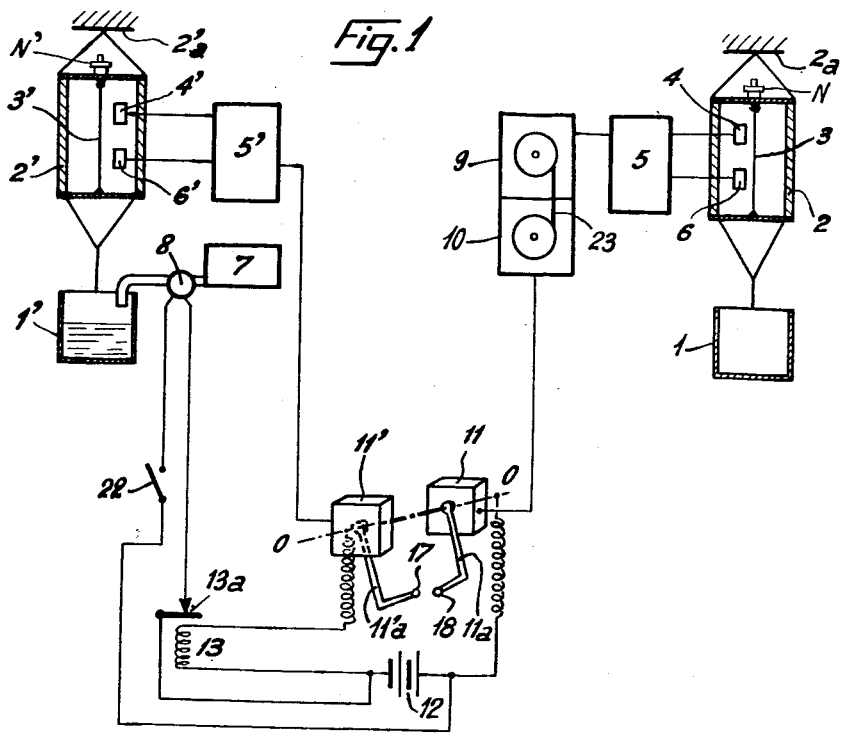
Figure 2:
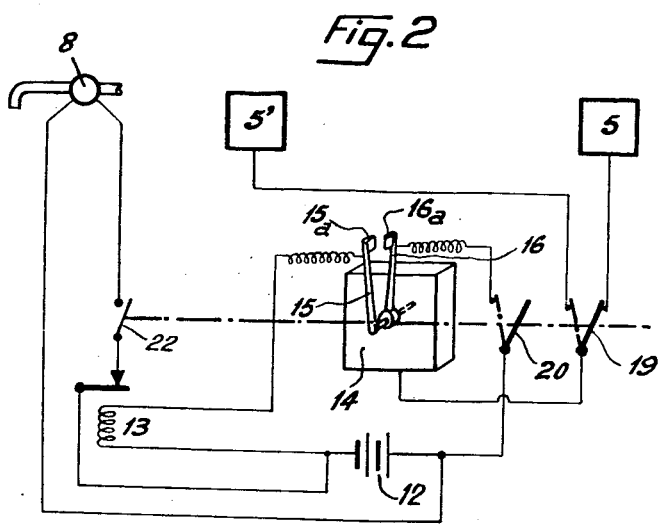

FIGS. 5 and 6 respectively illustrate the use of the devices shown in FIGS. 3 and 4 in the respective embodiments illustrated in FIG. 1 and in FIG. 2.

In the system illustrated in FIG. 1 there is shown at 1 an empty receptacle being weighed prior to filling, and at 1' the same receptacle being weighed during the filling operation. The receptacle 1 or 1' is suspended from a dynamometer arrangement in the form of a tube 2 (or 2') of resilient material suspended in turn at 2a (or 2a') from a fixed support. For measuring the elongations of the dynamometer tube there is provided a vibratory string 3 (or 3') stretched in axial relation within the related tube by attachment to end closure members of the latter. As is well known, in the vibratory-string dynamometers, adjusting means, shown in the form of nuts N, N', are used for setting the initial stretching of the strings 3 and 3', i.e., to set the vibratory frequency of each dynamometer without load. Cooperating with the vibratory string is an electromagnetic pick-up member 4 (or 4') adapted in response to the vibratory condition of the string to generate an electric audio signal at a frequency corresponding to the vibratory frequency of the string which signal is applied to an audio amplifier 5. The vibratory condition of the string is sustained by the action of a further electromagnetic element 6 or vibrator, mounted adjacent a point of the string and energized with part of the output from amplifier 5 (or 5') after suitable phase displacement of it such as to provide a conventional self-sustaining feedback system.

The receptacle 1' at the filling station is filled with material, such as a liquid or pulverulent solid, through a feeder nozzle or chute controlled by a valve 8 and connected with a suitable hopper or other suitable source of supply 7. The valve 8 may be of any suitable type operable by means of an electric signal as will be further described.

As is well-known, the vibratory frequency $n$ produced by the string of a dynamometer subjected to a load $p$ may be expressed by the equation $$n = K\sqrt{po + p} \qquad (1)$$

where K is a constant and $po$ is a fixed initial term which results from the formula of the initial vibratory frequency equation $$no = K\sqrt{po} \qquad (2)$$

assuming that the dynamometer is not loaded. The term $po$ may be considered as a fictitious initial charge of the dynamometer which may be chosen by tensioning at will the string 3 (or 3') owing to the nut N (or N'). It will be understood that increasing the initial stretching of the string 3 (or 3') (the cross-section of which is very small) negligibly shortens the tube 2 (or 2') and consequently does not modify the subsequent elongation of said tube under varying loads in operation, i.e., whatever is the initial tension of the string 3 (or 3'), the elongation of the tube 2 (or 2') under a given load is the same and in the Equation 1 the terms $po$ and $p$ are independent.

According to the invention, the adjustments are so made that, whereas the initial frequency of the dynamometer string 3' at the filling station has the value $$n_2o = K\sqrt{po} \qquad (3)$$

in accordance with Equation 2 above, the initial frequency of the dynamometer string 3 at the pre-weighing station shall have the value $$n_1o = K\sqrt{po + P} \qquad (4)$$

where P is the desired, constant, net weight of the charge of material to be filled into each receptacle. In other words, matters are so arranged that the initial string frequency at the pre-weighing station shall equal the frequency assumed by the string at the filling station under a load equal to the desired weight P of material. It is assumed of course that the dynamometers at both stations have been rendered identical by construction and/or adjustments so that the two constants K are the same.

In these conditions, assuming a receptacle of deadweight equal to $P_1$ is suspended to the pre-weighing station dynamometer, it being understood that the value $P_1$ will usually vary as from one receptacle to another, the vibratory frequency of the related string 3 will assume the value $$n = K\sqrt{po + P + P_1} \qquad (5)$$

Thereafter, when the same receptacle is suspended from the filling station dynamometer tube and the filling operation is initiated, the frequency of the related string 3', will increase from its initial value $n_2o$ as given by Equation 3 and will assume exactly the same value as that given by Equation 5 when the receptacle has been filled with the complement of material weighing the desired net weight P.

With such an arrangement it is evident that it is necessary to compare two vibratory frequencies occurring at different instants of time since both weighing operations involving one and the same receptacles cannot be carried out simultaneously. According to a feature of the invention therefore, the frequency emitted by the string 3 during the pre-weighing operation is recorded or stored in a suitable memory device shown in FIG. 1 as a conventional tape recording mechanism 9. Other equivalent recording or storage devices may be used, such as magnetic wire, magnetic drum storages or the like.

Memory read-out, or record playback, means are provided for reemitting the memorized or recorded pre-weighing frequency during the progress of the filling operation and for ascertaining the instant at which the gradually rising frequency of the string 3' at the filling station reaches a value equal to that of the originally recorded frequency of the string 3. The playback means may comprise a conventional pick-up device diagrammatically illustrated at 10 which may convert the magnetic record on the tape 23 into a modulated electric signal and if necessary amplify it to any desired level. FIG. 1 further illustrates one form of means for detecting a condition of unison between the played back acoustic frequency from pick-up 10 and the acoustic frequency generated by the filling-station amplifier 5. The means illustrated comprise two conventional frequency-meters 11 and 11' of the type having rotatable indicator arms 11a and 11a' adapted to be positioned in accordance with the frequency of an electric signal applied thereto. The two frequency-meters are adjusted to similar settings and are mounted in facing relation so that their indicator arms or pointers rotate about a common axis OO. The two pointers have end portions 17 and 18 projecting towards one another so as to establish a contact on both meters indicating a common frequency. Such contact completes an electric circuit extending from one terminal of a D.-C. source 12 through a relay winding 13 to the pivot of one pointer 11a'—17, and from the other source terminal to the pivot of the other pointer 11a—18, so that on engagement between the pointer contacts relay 13 is energized and opens a pair of contacts 13a which results in closure of the feeder valve 8. For this purpose, the electrically controlled valve 8 is here shown as being operated from the source 12 by way of a circuit including a manual switch 22 and the relay contacts 13a, the arrangement being such that the valve is displaced to open, or feeding, position when its control circuit is energized from the source, and is restored to its cut-off position when the circuit is deenergized as by the opening of the relay contacts 13a.

Summarizing the operation of the system thus described a receptacle 1 is first pre-weighed at the pre-weighing station including dynamometer 2—3, and the acoustic frequency generated by string 3 is recorded on the magnetic tape 23. Then the empty receptacle 1 is transferred to 1' at the filling station. The switch 22 is closed, whereupon electro-valve 8 is opened and feeds material into the receptacle, so that the frequency emitted by the string 3' gradually rises in pitch. Concurrently, playback pick-up device 10 reads the record on tape 23, and generates a constant frequency equal to the initial frequency produced by string 3 during the pre-weighing step. Thus the frequency-meter arm 11a assumes a constant position corresponding to this initial frequency whereas frequency-meter arm 11a' rotates as the pitch emitted by string 3' rises during the filling process. As the rising frequency attains a value equal to the fixed initial frequency, contact 17 engages contact 18, completing a circuit for relay winding 13, and relay contacts 13a open, deenergizing the control circuit for the electro-valve 8, which snaps shut and puts an end to the filling process.

The frequency-comparison arrangement described in connection with FIG. 1 requires rather high accuracy in the relative setting adjustment of the frequency-meters, as well as a high degree of similarity between their respective laws of response. Furthermore if the record tape or wire 23 is to be fed continuously it is necessary that the record be at least as lengthy as the time required by a filling operation. The above difficulties may be eliminated by using the alternative arrangement shown in FIG. 2. This uses a single frequency-meter 14 including the normal rotatable indicator arm 15 provided with the end contact 15a. The meter further includes a reference index arm 16 rotatably mounted coaxially with, but electrically insulated from, the arm 15, and having a contact 16a at its end. In this arrangement, the input to the meter is switchable by means of a reverser switch 19 between the outputs from the respective amplifiers 5 and 5'. Moreover the energizing circuit for relay winding 13 which is connected as shown in circuit with both arms 15 and 16 includes a switch 20 which is preferably ganged with reverser switch 19. During the pre-weighing step, reverser switch 19 is in the full-line position shown so that the frequency-meter is connected with the output from amplifier 5, while switch 20 is in its open, full-line position, so that relay 13 is deenergized, its contacts are closed. The indicator arm 15 of the meter is now rotated to a position determined by the pitch produced by string 3, i.e. by the weight of container 1. During this movement of the pointer 15, contact 15a acts mechanically on contact 16a to rotate the index 16, so that this index is brought to a corresponding position. Since switch 20 is open the engagement of contacts 15a—16a does not act to energize relay 13. On completion of the pre-weighing step container 1 is removed from the dynamometer 2 and arm 15 is returned to its initial position by suitable means not shown, whereas reference index 16 retains the position attained by it. When the empty container 1 is suspended from the dynamometer 2' the reverser switch 19 is moved to its dotted-line position and switches 20 and 22 are simultaneously closed. This closure of switch 20 prepares the energizing circuit for relay 13. When the filling process commences, arm 15 begins to rotate again and when it again reaches the position in which its contact 15a engages contact 16a, relay 13 is energized, closing valve 8 and arresting the filling process at the proper time. Thereafter the switch arms 19 and 20 are restored to their original positions and, through means not shown, index 16 is restored to a zero position which should be selected beyond the position corresponding to the frequency value of dynamometer 2' determined by the most lightweight receptacles used.

It will be noted that in the embodiment of FIG. 2 the frequency-meter index 16 serves as the memory device for storing the first frequency indication, whereby the system is considerably simplified. Moreover, the aforementioned difficulty in connection with the identical responses of the meters of FIG. 1 is eliminated. On the other hand, this arrangement has a disadvantage in that it requires the provision of as many frequency-meters, to be used in succession, as there are receptacles in simultaneous use between (and including) the weighing stations. This was unnecessary in the case of FIG. 1 since the tape record corresponding to any given receptacle could be played back at any time just for that receptacle. The difficulty, however, is a relatively minor one since the respective meters thus provided may have rather widely-differing response curves and indeed, it is permissible for the response curve of each meter to change slowly with time, provided the response curve remains sufficiently stable over the relatively short interval of time between the two weighing steps involving any one receptacle.

While the invention is not limited to any particular type of frequency-meter, and many different types might be satisfactory, one that has given especially suitable results is the so-called phase-discriminating type of frequency-meter as shown in FIG. 3. The input signal whose frequency is to be measured as derived from the output of 5, 10 or 5' in FIG. 1 for example, is applied to an input or primary winding 25. A secondary winding 26 coupled thereto has a capacitor 27 in parallel with it to provide an oscillatory circuit tuned to a frequency value substantially equal to the average of the frequencies to be measured. Further the input signal is applied by way of a capacitor 28 to a midpoint of secondary 26. A pair of rectifier diodes $29_1$ and $29_2$ are connected to the ends of secondary windings 26 and a load impedance 30 is connected between the midpoint of 26 and the midpoint of an RC filter network 31 connected to the opposite poles of the rectifiers. Thus the rectified voltage between point 32 connected to one end of the filter network and ground connected to the opposite end, is proportional to the input frequency over a wide frequency band. A voltmeter type instrument 34 connected across said points may thus be calibrated in frequency values and its pointer will serve the function of pointers 11a, 11a' and 15 in FIGS. 1 and 2.

It will be understood, however, that the pointer of such a voltmeter or similar instrument will only be capable of developing very low mechanical torques and is preferred, according to the invention, to provide suitable servo-mechanism for amplifying the mechanical actions produced by the frequency-meter or meters used in the precedingly described embodiments.

One convenient means for this purpose is an optico-electrical follow-up system now to be described. The instrument 34 in FIG. 3 is provided in the form of a micro-galvanometer having a rotatable mirror 35 upon which a light pencil is directed from a suitable source not shown, and the reflected image or spot of light is applied to a suitable "image-follower" device known per se, e.g. of the form diagrammatically shown in FIG. 4. A photo-resistance cell 36 is mounted on a small carriage 37 movable along parallel tracks 39 between which the image reflected from mirror 35 is adapted to form as indicated at 38. The carriage is connected by a looped thread 40 trained over a return pulley 41 on one side and looped one or more times around a drive pulley 42 at the other side around a drive pulley 42 driven from electric motor 43. Projecting laterally from carriage 37 are a pair of slider arms 44 and 45 which are electrically connected with the output terminals of the photo-cell and project into sliding frictional engagement with the pair of parallel conductive rails 46 and 47. The energizing circuit for the cell includes a D.-C. source 48 having one side connected to one rail 46 and its other side connected by way of a relay winding 49 with the other rail 47. Relay 49 controls a reverser switch arm 50 between a pair of contacts connected to the end of a split field winding of the motor, and arm 50 is connected to one terminal of the exciting source 51 for the motor so that energization and deenergization of relay 49 will serve to reverse the sense of rotation of motor 43. That is, in the deenergized condition of the relay 49 contact arm 50 completes one of the field-energizing circuits of motor 49 so as to rotate the motor in a sense to displace carriage 37, through wire 40, in the direction shown by arrow F corresponding for example to the direction in which light spot 38 will move with increasing frequencies. Thus, during a frequency measurement the image 38 will start its displacement from the left-hand end of track 39 and move rightward. With no light reaching the cell 36 the winding 49 is practically deenergized and the contact arm 50 remains in its initial or idle position, so that carriage 37 moves in the same direction as the light image 38. When the carriage has caught up with the image 38 so that the photo-resistance cell 36 is illuminated, its resistance drops sharply and the current through relay winding 49 rises causing armature 50 to be attracted, reversing the sense of rotation of motor 43. The carriage 37 now moves leftward, away from the light spot or image 38; however, this places the photo-cell back into the dark, so that the motor again reverses its sense of rotation and moves the carriage back toward the light. Thus the carriage 37 is made to follow the displacements of the image and an index 53 carried by said carriage will closely simulate the displacements of the light spot 38.

FIGS. 5 and 6 illustrate one manner in which the known devices described with reference to FIGS. 3 and 4 may be put to use in practicing the present invention, as embodied in FIG. 1 and 2 respectively.

In FIG. 5, there are provided two frequency-meters $54_1$ and $54_2$ each of which may be constructed in accordance with the circuit diagram of FIG. 3, these meters being substituted for the meters indicated at 11 and 11' respectively in FIG. 1. The light spots reflected from the mirrors $35_1$ and $35_2$ of the respective meters cooperate with the respective follower devices $55_1$ and $55_2$ each of which may be similar to the device 55 shown in FIG. 4. The indexes $53_1$ and $53_2$ associated with the respective optical follower devices are constituted as the movable arms of potentiometers $56_1$ and $56_2$ which are connected, together with resistors $57_1$ and $57_2$, into a Wheatstone bridge circuit across one diagonal of which a source of D.-C. energy 58 is connected and across the other diagonal of which is connected a galvanometer or milliammeter 59 of the type having end limit contacts.

When the recorded frequency played back the pick-up 10 is supplied to frequency-meter $55_1$ its index $53_1$ promptly assumes its final position whereas the slider or index $53_2$ associated with the other meter $55_2$ fed with the output from amplifier 5' only assumes its position gradually as the associated frequency rises with gradual filling of the receptacle at 1'. The index arm 59a of the contact-instrument 59 therefore remains in engagement with its one limit stop 60 until such time as the balanced condition of the Wheatstone bridge circuit has been destroyed whereupon the pointer 59a is displaced to its opposite limiting position in which it bridges a pair of contacts completing a supply circuit for the relay 13 which has a similar function to relay 13 in FIG. 1.

FIG. 6 similarly illustrates the application of a frequency-meter 54 of the type shown in FIG. 3 and an optical follower $55_3$ as shown in FIG. 4 to an embodiment of the invention generally arranged in the manner shown in FIG. 2. In this case the index $53_3$ of the image-follower slides in electrical contact engagement with a conductor rail 61, and in its rightward movement it is able to carry along with it a slider 63 movably mounted on the parallel conductive rail 62. The index $53_3$ further carries a small solenoid 64 having one end of its winding connected with said index and its other end connected with a contact brush 65 slidable along the rail 66. The slider 63 is at least partly made of ferromagnetic metal for cooperation with the solenoid. Rail 66 is connected with D.-C. source 12 through a cut-off switch 67 which is ganged with the switch 20 and reverser switch 19, the functions of which latter two switches have been described in reference to FIG. 2. This system operates as follows:

During the pre-weighing operation, the parts are positioned as shown in FIG. 6, with reverser 19 passing the output from amplifier 5 to frequency-meter $54_3$, and switches 20 and 67 open. Index $53_3$ in its displacement carries the slider 63 rightward until the position of the slider corresponds to the frequency indicating the dead weight of the receptacle. On completion of the pre-weighing operation the index 53a is moved back leftward while the slider 63 remains at the position attained by it, it being noted that at this time solenoid 64 is deenergized. During the weighing operation while the receptacle is being filled, switches 20 and 67 are both closed and reverser switch 19 is reversed to pass the output from amplifier 5' to the meter. Index $53_3$ now moves rightward as the frequency increases as receptacle 1' is gradually filled. On the index reengaging the slider 63, indicating that the receptacle has been filled with the desired weight of material, relay 13 is energized by the contact thus made between the slider and index, closing electro-valve 8. Moreover, solenoid 64 is now energized from source 12 by way of the circuit completed by switch 67 and rail 61, so that the slider 63 is now mechanically connected with the index. Hence, as the index recedes leftward after completion of the weighing operation it carries the slide 63 along with it.

In order to initiate a fresh pre-weighing operation in connection with a further receptacle, the switches 19, 20 and 67 are all moved to their rightward positions as shown in FIG. 6.

It will be understood that various other embodiments than those specifically shown and described may be conceived within the scope of the invention as defined by the ensuing claims. Thus, in the embodiment of FIG. 1 for example, any suitable differential frequency-responsive circuit may be substituted for the dual frequency-meter arrangement shown. Any servomechanism or feedback system may be used in place of the photo-electrical system described. The vibratory-string dynamometers may be constructed for working under compression rather than tension loading, in which case the receptacles wonted be positioned atop the dynamometers rather than being suspended therefrom as shown. In such case, of course, the frequency or pitch would gradually fall as the filling proceeds, instead of gradually rising as herein stated.

What I claim is:

1. A system for filling a plurality of receptacles each with an equal weight of material comprising, a first and a second similar vibrating-string dynamometer devices adapted to generate acoustic vibration frequencies corresponding to the loads supported by said devices, the second device being relatively set with respect to the first for providing when only loaded with said weight of material the same frequency as the first device when unloaded; means for supporting an empty receptacle from said first device; means for recording the frequency generated by said first device when the receptacle is in supported position; means for supporting said receptacle from the second device; means for feeding material to the receptacle while thus supported in said second device whereby said second device generates a gradually varying second frequency as the filling progresses; and means responsive to said second frequency and to said recorded frequency and connected to said feeding means for cutting off the feed of material into said receptacle when said second frequency attains a value corresponding to said recorded frequency.

2. A system for filling a plurality of receptacles each with an equal weight of material comprising; a first and a second similar vibrating-string dynamometer devices adapted to generate acoustic vibration frequencies corresponding to the loads supported therefrom, the second device being relatively set with respect to the first for providing when only loaded with said weight of material the same frequency as the first device when unloaded; means for supporting an empty receptacle of the plurality from said first device; a first displaceable member; means responsive to the frequency generated by said first device when the receptacle is in supported position to displace the first member to a position corresponding thereto; means for supporting the receptacle from said second device; means for feeding material into the receptacle while supported in said second device whereby said second device will generate a gradually varying frequency; a second displaceable member; means responsive to the frequency generated by said second device when the receptacle is in supported and feeding position to displace said second member; and means responsive to attainment by said second member of a position corresponding to that of said first member for cutting off the feed of material to said receptacle.

3. A system for filling a plurality of receptacles each with an equal weight of material comprising, a first and a second similar vibrating-string dynamometer devices adapted to generate acoustic vibration frequencies corresponding to the loads supported by the devices, the second device being relatively set with respect to the first for providing when only loaded with said weight of material the same frequency as the first device when unloaded; means for supporting an empty receptacle of the plurality from said first device; means for recording the frequency generated by said first device when the receptacle is in supported position and for storing the resulting record; means for supporting said receptacle from the second device; means for feeding material to the receptacle while supported in said second device whereby said second device generates a gradually varying second frequency; means for playing back said record during operation of said feeding means to reproduce said recorded frequency; and means responsive to both said second frequency and said reproduced frequency and connected to said feeding means for cutting off the feed of material on attainment by said second frequency of a value corresponding to said frequency.

4. A system as claimed in claim 3, wherein said responsive means include a pair of displaceable members, a pair of frequency-meter means respectively connected to receive both said frequencies and operative to position said respective members in proportion to the frequencies received thereby, and means operated by attainment by said members of corresponding positions to cut off said feeding means.

5. A system as claimed in claim 2, wherein said responsive means includes a frequency-meter having a movable indicator member constituting said second displaceable member, and including a movable reference index movable on a parallel path to said indicator member shiftable thereby in the increasing frequency direction, and constituting said first indicator member, means being provided for connecting said frequency-meter to receive the frequency output from said first device whereby said indicator member will displace said movable index to a position corresponding to the frequency generated by said first device, and for thereafter connecting said frequency-meter to receive the frequency output from said second device whereby said indicator member will reengage said movable index, and said responsive means responding to such reengagement cut off said feed of material.

6. A system as claimed in claim 1, wherein said frequency-responsive means includes at least one frequency-meter operative to generate a variable output voltage in accordance with a frequency applied to the meter, and means for indicating said voltage.

7. A system as claimed in claim 3, including a normally balanced electrical bridge circuit having variable impedances in opposed arms thereof, and wherein said means responsive to both said frequencies include displaceable output means arranged for varying said respective impedances to unbalance said circuit on attainment by said second frequency of said value corresponding to the recorded frequency, and electrical means responsive to an unbalance signal from said circuit for cutting off said material feeding means.

8. A system as claimed in claim 1, wherein said frequency responsive means include at least one photo-electrical system including means producing a light pencil that is positionable in accordance with the frequency applied to said system, a reversible electric motor, and photo-electrical cell means mechanically driven from and electrically connected with said motor and exposed to said light pencil for rotating the motor in one or the opposite sense according as said photo-electrical cell means is or is not illuminated by said light pencil, whereby said cell means is positioned in accordance with the frequency applied to said system, and means responsive to the position of said cell means and connected with said material feeding means to disable the latter on said cell means attaining a predetermined position.

No references cited.